Patented June 6, 1950

2,510,605

UNITED STATES PATENT OFFICE 2,510,605

PRODUCTION OF NITRILES

Frank Porter, Morristown, and Michael Erchak, Jr., and John N. Cosby, Morris Plains, N. J., assignors to Allied Chemical & Dye Corporation, New York, N. Y., a corporation of New York No Drawing. Application April 6, 1946, Serial No. 660,304

10 Claims. (Cl. 260—296)

This invention relates to a process for the production of nitriles by oxidizing in the presence of ammonia a monoalkyl or monoalkenyl substituted pyridine or a polyalkyl or polyalkenyl substituted pyridine with no more than one alkyl or alkenyl substituent in the 2, 4 and 6 positions, or an alcohol, an aldehyde or a ketone which is an intermediate oxidation product of such substituted pyridine.

It is known that by oxidizing certain aromatic compounds in the vapor phase by means of molecular oxygen, those compounds may be converted to partial oxidation products such as acids or acid anhydrides. Thus it is well known that benzene vapors may be oxidized with air or other oxygen gas to form maleic anhydride or maleic acid. Naphthalene may be oxidized to phthalic anhydride. These oxidation reactions, carried out by passing the mixture of aromatic compound and molecular oxygen in contact with an oxidation catalyst at suitable conditions of temperature, reaction time, etc., give good yields of the desired intermediate oxidation product.

The vapor phase oxidation process, however, has not been found applicable for oxidation of pyridine or of the alkyl or alkenyl substituted pyridines. It has heretofore been attempted to thus oxidize pyridine and picolines but low yields, if any, of the desired oxidation products, e. g. the related acids, were obtained due to the tendency for the pyridine and picolines to burn completely to oxides of carbon and water. Their oxidation cannot be controlled as can the oxidation of benzene or naphthalene to proceed to a given stage of partial oxidation such as the formation of an acid. Thus, it has been reported that when pyridine mixed with air is passed at 430° C. to 600° in contact with a catalyst containing oxides of vanadium and uranium, the only oxidation products obtained are water, carbon dioxide, ammonia and nitrogen oxides (C. A. 31, 5790 (1937)).

We have now discovered, however, that in oxidizing an alkyl or alkenyl substituted pyridine in the vapor phase with molecular oxygen by having ammonia present in the reaction mixture nitriles may be formed in good yields. It appears the ammonia reacts with partial oxidation products of the substituted pyridine to form nitriles which are relatively stable under the reaction conditions and hence are not further oxidized down to, for example, oxides of carbon and water. Our discovery provides, therefore, a method whereby desired, useful products may be obtained in good yields in the oxidation of the substituted pyridine and may be recovered from the reaction products.

The aromatic compounds suitable for conversion into nitriles by the process of this invention are the substituted pyridines containing in any of the 3 and 5 positions and in no more than one of the 2, 4 and 6 positions a substituent represented by the formula

where R represents —H or an alkyl or an alkenyl radical and R' and R" represent —H, —OH or =O or an alkyl or alkenyl radical. Thus, the aromatic compounds which may be converted into the related nitriles by the process of this invention comprise the monoalkyl and monoalkenyl substituted pyridines, the polyalkyl and polyalkenyl substituted pyridines in which there is no more than one alkyl or alkenyl substituent in the 2, 4 and 6 positions, and the intermediate partial oxidation products of these mono- and polyalkyl or alkenyl substituted pyridines; i. e., the corresponding alcohols, aldehydes and ketones containing the pyridine ring.

The following are representative of the various substituted pyridines which may be oxidized in the presence of ammonia in accordance with the process of our invention to form the indicated nitriles:

Alpha-, beta-, or gamma- picoline to form the corresponding pyridine carboxylic acid nitrile, alpha-picolinic nitrile, nicotinonitrile or gamma-picolinic nitrile, respectively;

3,5-dimethylpyridine to give the corresponding mono- or di-nitriles;

2-methyl-5-ethylpyridine to give the corresponding mono- or dinitriles;

3-methyl-6-ethylpyridine to give the alpha-mononitrile.

The presence of substituents in more than one of the 2, 4 and 6 positions appears to render the molecule unstable, preventing formation of the nitrile in oxidizing the substituted pyridines in the presence of ammonia. For example, in oxidizing 2,4-dimethylpyridine no recoverable amounts of nitriles were produced under the same conditions which lead to the formation of nitriles from alpha- and gamma-picolines and from 2-methyl-5-ethylpyridine. Accordingly, in treating a polysubstituted alkyl or alkenyl pyridine in accordance with the process of our invention, the starting material should be chosen from the poly-substituted compounds in which no more than one of the substituents is in the 2, 4 and 6 positions.

In place of ammonia a primary alkyl amine may be used to form the nitriles. Any nitrogen compound converted into ammonia at the elevated temperatures at which the oxidation of the substituted pyridine is carried out may be used in place of ammonia.

The reaction mixture should contain at least one molecule of ammonia for every one nitrile radical combined in the product of the reaction. Further, it has been found that about two molecules of ammonia for every —CN radical to be combined with the substituted pyridine represents a ratio below which the yields of nitrile rapidly decrease. The yields of nitrile are improved by additionally including in the reaction mixture about one mol of ammonia for every carbon atom to be removed from the substituted pyridine in forming the nitrile. Accordingly, we preferably pass into contact with the oxidation catalyst a reaction mixture containing, in addition to 2 mols $NH_3$ for each —CN radical to be formed by the reaction, about 1 mol or more of ammonia for every carbon atom which is to be burned from the molecule of the substituted pyridine in forming the desired nitrile. More than these amounts of ammonia may, of course, be used but as the amount of ammonia is increased above these proportions, the amount of ammonium carbonate and carbamate in the product gases increases. Large quantities of the carbonate and carbamate increase the difficulty in recovering the nitrile from the oxidation products.

The following are representative of the ratios of ammonia to substituted pyridine which it is preferred to employ in the inlet gases for formation of the nitrile and of the preferred additional amount of ammonia in these gases when carbon is burned from the molecule of the substituted pyridine in forming the nitrile:

in oxidizing a monomethyl substituted pyridine to the corresponding nitrile—about 2 or more mols of ammonia for every 1 mol of the substituted pyridine;

in oxidizing a dimethyl substituted pyridine to the corresponding dinitrile—about 4 or more mols of ammonia for every 1 mol of the dimethyl pyridine;

in oxidizing 2-methyl-5-ethylpyridine or 3-methyl-6-ethylpyridine to the mononitrile—about 2 or more mols of ammonia for every 1 mol of the substituted pyridine;

in oxidizing 2-methyl-5-ethylpyridine to the dinitrile—about 5 mols or more of ammonia for every 1 mol of the substituted pyridine.

When a primary alkyl amine is employed instead of ammonia, the same molecular proportions are used of amine to substituted pyridine as described above for ammonia.

Other conditions in carrying out the process of our invention may be those heretofore employed for the vapor phase oxidation of aromatic compounds, e. g. for the oxidation of benzene to maleic anhydride or naphthalene to phthalic anhydride. Thus, in carrying out our invention the substituted pyridine mixed with air or other oxygen gas in proportions such that the mixture is non-explosive, is passed at elevated temperatures in contact with an oxidation catalyst. The reaction mixture may contain an excess of oxygen over that stoichiometrically required for the oxidation of the aromatic compound to the related acid or even an excess over that required for complete oxidation of the aromatic compound. Insufficient oxygen for oxidation of the aromatic compound to the related acid may be used. The rate of passage of the reaction mixture over the catalyst, temperature, and other operating conditions are regulated, as known to those familiar with the art of partially oxidizing aromatic compounds, to give a desired attack of the organic material without undue complete oxidation to oxides of carbon and water. While the several reaction conditions are related to each other so variations in one condition will permit varying another condition without substantially affecting the results of the process, a representative set of conditions is as follows: passing a reaction mixture containing 1.5 to 7 mols $NH_3$ and 50 to 200 mols air for every 1 mol of the substituted pyridine over a catalyst active for oxidizing benzene to maleic anhydride at about 425° C. to about 475° C. and a space velocity of 2000 to 5000 cc. of reaction gas (calculated to S. T. P.) per hour per cubic centimeter apparent volume of catalyst.

The catalysts employed in carrying out our process may be any of the catalysts which promote the oxidation of organic compounds, preferably those catalysts which have been found particularly suitable for oxidizing benzene to maleic anhydride or naphthalene to phthalic anhydride. The preparation and composition of preferred catalysts are disclosed, for example, in United States Patents 2,081,272 which issued May 25, 1937 to Harold B. Foster and 2,180,353 which issued November 21, 1939 to the same inventor, and United States Patent 2,294,130 which issued August 24, 1942 to Frank Porter. When substituted pyridines are oxidized in the presence of ammonia or a primary alkyl amine to form nitriles, however, the nature of the catalyst appears to be of less importance than in the oxidation of benzene or naphthalene to maleic anhydride or phthalic anhydride. Thus, catalysts which give but poor yields of the acid anhydrides, may be used effectively when the oxidation is carried out with ammonia or the amine present in accordance with our invention. We attribute this to the ammonia or amine reacting with intermediate oxidation products of the substituted pyridines, particularly with alcohols, aldehydes, ketones or acid anhydrides to form the corresponding nitriles and to these nitriles being exceptionally stable under the reaction conditions. Hence, the nitriles are formed and remain undecomposed under conditions which do not give good yields of less stable intermediate oxidation products which are formed in the previously known procedures of oxidizing aromatic compounds with molecular oxygen.

Among the numerous catalysts which may be employed in carrying out our process, we may mention thorium, molybdenum, vanadium, tin, chromium, tungsten, cobalt, iron, manganese or copper, employed as the metals or the metal oxides, the oxides of aluminum, uranium, etc., vanadates, vanadic acid and mixtures of these various catalysts with each other and with other materials. Vanadium oxide is especially active for the partial oxidation of benzene and naphthalene and is similarly especially desirable as a catalyst for the oxidation of the alkyl and alkenyl substituted pyridines in carrying out the process of this invention, particularly catalysts containing both vanadium and molybdenum oxides. While the suitable temperatures will vary according to the particular catalysts being employed and other operating conditions, in general the reaction mixture containing the substituted pyridine, oxygen and ammonia or primary amine is contacted with the catalyst at temperatures ranging from about 350° C. to 600° C., preferably at about 400° C. to about 500° C.

Our invention will be further illustrated by the following examples:

*Example 1.*—A mixture of ammonia, beta-picoline vapors and air in the proportions of 2 mols ammonia, 1 mol beta-picoline and 150 mols air is preheated and passed in contact with a vanadium-molybdenum-phosphorus catalyst at 425° C. and a space velocity of 2900. The catalyst is prepared by the procedure described for making "Catalyst A (a maleic anhydride catalyst)" on page 2 of United States Patent 2,294,130 of August 24, 1942 to Frank Porter. In making the catalyst, ammonium vanadate, molybdenum trioxide and phosphoric acid are used to form the active catalytic material and 8–10 mesh alundum as a carrier, in proportions such that the catalyst contains 11.4% vanadium, 3.9% molybdenum and 0.034 phosphorus (calculated as the oxides $V_2O_5$, $MoO_3$ and $P_2O_5$, respectively). Using this catalyst and with the foregoing reaction conditions, 51% of the beta-picoline was attacked with a 60 mol percent yield of nicotinonitrile based on the beta-picoline attacked.

In the process of this example by contacting a reaction mixture containing 2 mols of ammonia for every 1 mol of beta-picoline and 100 mols air with the catalyst at 425° C. and a space velocity of 2080, 65.8% of the beta-picoline was attacked with a 57.5 mol percent yield of nicotinonitrile.

*Example 2.*—Alpha-picoline mixed with ammonia and air in the proportions of 4 mols ammonia, 1 mol alpha-picoline and 200 mols air was passed in contact with the catalyst of Example 1 at 470° C. and a space velocity of 3420. 56.6% of the alpha-picoline was attacked with about 27 mol percent yield of alpha-picolinic nitrile.

*Example 3.*—Gamma-picoline mixed with 3 mols of ammonia and 205 mols air for every 1 mol of the gamma-picoline was passed in contact with the catalyst of Example 1 at a temperature of 465° C. and a space velocity f 3060. 75% of the gamma-picoline was attacked with about a 59 mol percent yield of gamma-picolinic nitrile.

We claim:

1. The process for the production of nicotinonitrile which comprises contacting a gas-vapor reaction mixture containing molecular oxygen, ammonia and beta-picoline with an oxidation catalyst containing oxides of vanadium, molybdenum and phosphorus at temperatures in the range of about 400° to about 500° C., said reaction mixture containing at least about 2 mols of ammonia, for every 1 mol of beta-picoline.

2. The process for the production of an aromatic nitrile which comprises contacting with a catalyst for the vapor phase partial oxidation of benzene and naphthalene, respectively, to maleic and phthalic anhydride, a gaseous mixture containing oxygen, ammonia substituted pyridines in which the substituents are aliphatic, non-acetylenic hydrocarbon radicals and in which at least two of the 2, 4 and 6 positions of the pyridine ring contain no substituent, and the alcohols, aldehydes and ketones which are intermediate partial oxidation products of said substituted pyridines, said gaseous mixture containing at least 1 mol of ammonia for every one —CN radical in the nitrile reaction product of said organic compound and being contacted with said catalyst at temperatures in the range 350° to 600° C.

3. The process for the production of an aromatic nitrile which comprises contacting with a catalyst for the vapor phase partial oxidation of benzene and naphthalene, respectively, to maleic and phthalic anhydride, a gaseous mixture containing oxygen, ammonia and an organic compound from the group consisting of the substituted pyridines in which the substituents are aliphatic, non-acetylenic hydrocarbon radicals and in which at least two of the 2, 4 and 6 positions of the pyridine ring contain no substituent, and the alcohols, aldehydes and ketones which are intermediate partial oxidation products of said substituted pyridines, said gaseous mixture containing at least 2 mols ammonia for every one —CN radical in the nitrile reaction product of said organic compound and in addition thereto about 1 mol of ammonia for every carbon atom burned from the molecule of said organic compound in forming the nitrile, and being contacted with said catalyst at temperatures in the range 350° to 600° C.

4. The process for the production of an aromatic nitrile which comprises contacting with a catalyst for the vapor phase partial oxidation of benzene and naphthalene, respectively, to maleic and phthalic anhydride, a gaseous mixture containing air, ammonia and an organic compound from the group consisting of the substituted pyridines in which the substituents are aliphatic, non-acetylenic hydrocarbon radicals and in which at least two the 2, 4 and 6 positions of the pyridine ring contain no substituent, and the alcohols, aldehydes and ketones which are intermediate partial oxidation products of said substituted pyridines, said gaseous mixture containing 1.5 to 7 mols ammonia and 50 to 200 mols air for every 1 mol of the organic compound and being contacted with said catalyst at temperatures in the range of about 425° C. to about 475° C. and at a space velocity of 2000 to 5000 cc. of reaction gas (calculated to S. T. P.) per hour per cubic centimeter apparent volume of catalyst.

5. The process of claim 2 wherein the organic compound in the gaseous mixture contacted with the catalyst is an alkyl substituted pyridine in with at least two of the 2, 4 and 6 positions of the pyridine ring contain no substituent.

6. The process of claim 4 wherein the organic compound in the gaseous mixture contacted with the catalyst is an alkyl substituted pyridine in which at least two of the 2, 4 and 6 positions of the pyridine ring contain no substituent.

7. The process for the production of a pyridine carboxylic acid nitrile which comprises contacting with a catalyst for the vapor phase partial oxidation of benzene and naphthalene, respectively, to maleic and phthalic anhydride, a gaseous mixture containing oxygen, ammonia and a monomethyl substituted pyridine, said gaseous mixture containing at least about 2 mols ammonia for every 1 mol of said substituted pyridine and being contacted with said catalyst at temperatures in the range 350° to 600° C.

8. The process of claim 7 in which the substituted pyridine is beta-picoline whereby nicotinonitrile is formed.

9. The process for the production of a pyridine carboxylic acid nitrile which comprises contacting with a catalyst for the vapor phase partial oxidation of benzene and naphthalene, respectively, to maleic and phthalic anhydride, a gaseous mixture containing air, ammonia and a monomethyl substituted pyridine, said gaseous mixture containing 1.5 to 7 mols ammonia and 50 to 200 mols air for every 1 mol of the substituted pyridine and being contacted with said catalyst at temperatures in the range of about 425° C. to about 475° C. and at a space velocity of 2000 to 5000 cc. of reaction gas (calculated to N. T. P.) per hour per cubic centimeter apparent volume of catalyst.

10. The process of claim 9 in which the substituted pyridine is beta-picoline whereby nicotinonitrile is formed.

FRANK PORTER.
MICHAEL ERCHAK, Jr.
JOHN N. COSBY.

REFERENCES CITED

The following references are of record in the file of this patent:

UNITED STATES PATENTS

| Number | Name | Date |
|---|---|---|
| 1,937,962 | Jadger | Dec. 5, 1933 |
| 2,149,280 | Deem | Mar. 7, 1939 |
| 2,186,754 | Giamblano | Jan. 9, 1940 |
| 2,200,734 | Arnold | May 14, 1940 |
| 2,203,861 | Deem | June 11, 1940 |
| 2,289,036 | Parks | July 7, 1942 |
| 2,299,755 | Jolly | Oct. 27, 1942 |
| 2,300,741 | Cislak | Nov. 3, 1942 |
| 2,437,938 | Cislak | Mar. 16, 1948 |
| 2,450,632 | Caldwell | Oct. 5, 1948 |
| 2,456,380 | Cislak | Dec. 14, 1948 |

OTHER REFERENCES

Sidgwick "Organic Chemistry of Nitrogen" page 522, Oxford Press (1937).

Lucas, "Organic Chemistry" page 313, American Book Co.